Nov. 10, 1931.    W. BANFER    1,830,977
MILLING THE RAIL SEATS OF TIMBER TIES
Filed Nov. 10, 1930    2 Sheets-Sheet 1
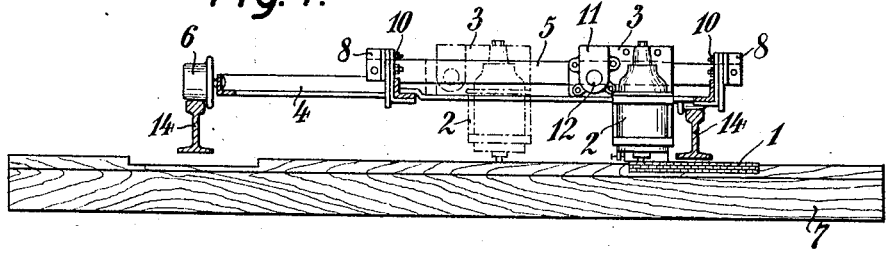
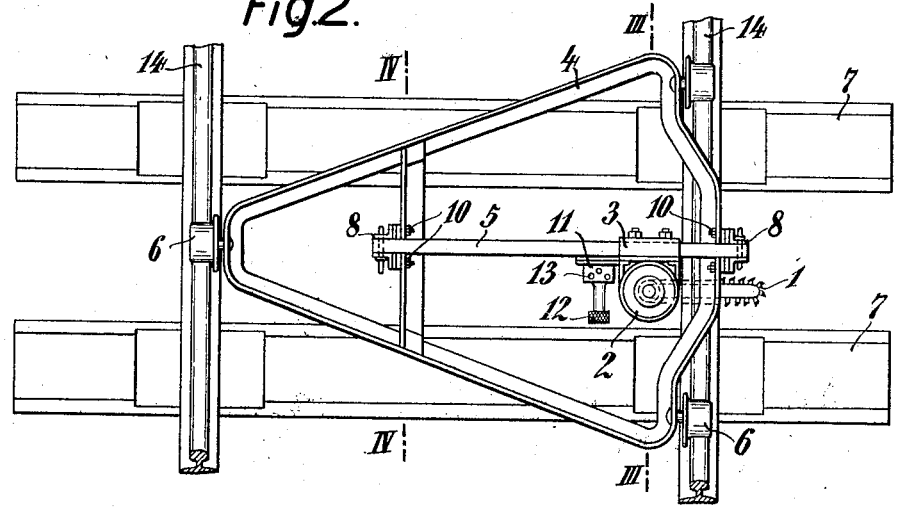
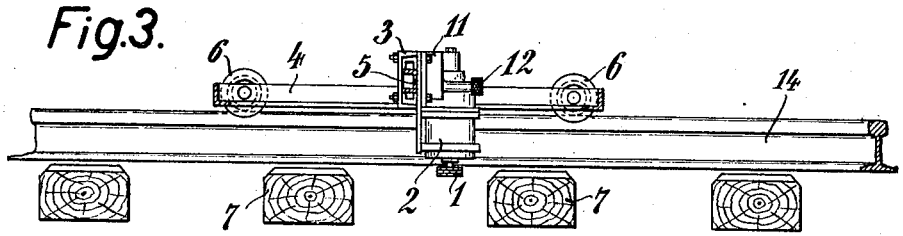
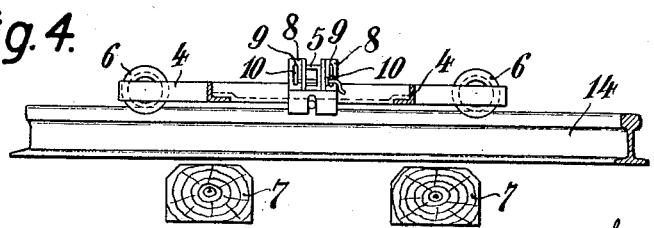

Nov. 10, 1931. W. BANFER 1,830,977

MILLING THE RAIL SEATS OF TIMBER TIES

Filed Nov. 10, 1930 2 Sheets-Sheet 2

Patented Nov. 10, 1931

1,830,977

UNITED STATES PATENT OFFICE

WILHELM BÄNFER, OF ESSEN, GERMANY, ASSIGNOR TO FRIED. KRUPP AKTIENGESELLSCHAFT, OF ESSEN-ON-THE-RUHR, GERMANY

MILLING THE RAIL SEATS OF TIMBER TIES

Application filed November 10, 1930, Serial No. 494,752, and in Germany November 16, 1929.

The invention relates to a milling machine intended for the removal of the decayed wood layer on the seats of the bearing plates of timber ties, and has for its object a machine of this class by which the recesses forming the seats for the tie plates can be re-milled from one side of the rail in one sole operation without the rail needing to be removed from the ties. This object is obtained substantially by the fact that the machine possesses a milling member which can be introduced between the rail and the tie and is formed by a chain cutter which works in a horizontal plane.

Another characteristic feature of the invention consists in the fact that the chain cutter is arranged so as to be turned about a vertical axis. It results from this arrangement that the seats for the tie plates can be re-milled very accurately and that the shearing resistance of the milling teeth is increased, as experience has shown.

In order that the invention may be more readily understood, two embodiments of the same are illustrated by way of example in the drawings which accompanies and forms part of this specification. In the drawings Figure 1 is a central longitudinal section through the milling machine forming the first embodiment, Figure 2 is the corresponding top view;

Figure 3 is a section on line III—III of Figure 2, seen from the left,

Figure 4 is a section on line IV—IV of Figure 2, likewise seen from the left,

Figure 5:
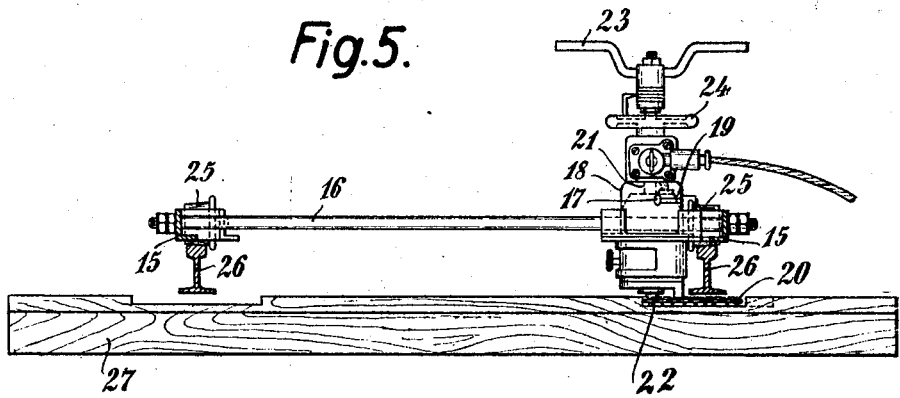
Figure 5 is a central longitudinal section through a milling machine forming the other embodiment.

The embodiment illustrated in Figures 1 to 4 will be described first.

1 denotes a chain cutter which is guided by and mounted on a unilaterally fixed horizontal carrier. The cutting teeth of the chain cutter 1 have a width such as to allow of the cutter to be introduced between the foot of the rail and the tie. The total length of the chain cutter is somewhat greater than the width of the tie plates used. The chain cutter 1 is driven by means of a vertical electric motor 2 or any other suitable prime mover such as a compressed air or internal combustion motor. The motor 2 is mounted on a slide 3 which can be shifted along a guide bar 5 rigid to the carriage 4 of the machine. The entire machine rests on three wheels 6 running on the track 14, 14. 7, 7 denote the ties of the track. The guide bar 5 is mounted on vertical guides 8 so as to be adjusted in vertical direction. To this end the guides 8 have suitable vertical slots 9, Figure 4, engaged by fixing screw bolts 10. Beside the motor 2 and rigid thereto is a case 11 including a rotary switch for the motor 2, with switch knob 12. Plug holes 13 serve to connect the flexible feed cable (not shown).

When plate seats are to be re-milled on ties, the carriage 4 is put on to the track 14 in such a manner that the chain cutter 1 is situated between two neighboring ties, see Figure 3, the motor and chain cutter taking a rearward inoperative position marked by dot and dash lines in Figure 1. After the respective tie plate has been removed from the seat to be re-milled, the motor 2 with the chain cutter 1 is shifted into working position marked by full lines in Figure 1, by forwarding slide 3 on bar 5, in which position the chain cutter 1 arrives below the foot of the rail. The adjustment of the chain cutter in vertical direction is made by setting bar 5 by means of the screw bolts 10, but any other suitable adjusting means may be made use of, such as vertical screw spindles or the like. The motor and chain cutter is then started by turning knob 12 and moved toward the plate seat to be re-milled by running the carriage 4 on the rails. The further feed motion in milling-off the decayed wood layer is likewise made in this manner, either by hand or by any suitable mechanical feeding means.

When the track 14, 14 has to be made free for the passage of a train the motor 2 with the chain cutter 1 is shifted back from working position, Figure 2, into inoperative position illustrated by dot and dash lines in Figure 1 and the entire machine lifted and removed from the rails. The weight of the machine is such that it can be lifted by two men.

Figure 6:
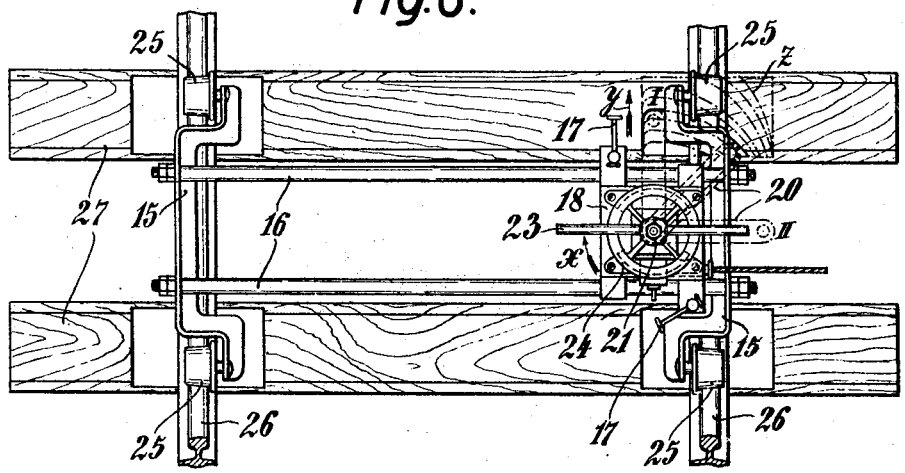
Figure 6 is the corresponding top view.
Figure 7:
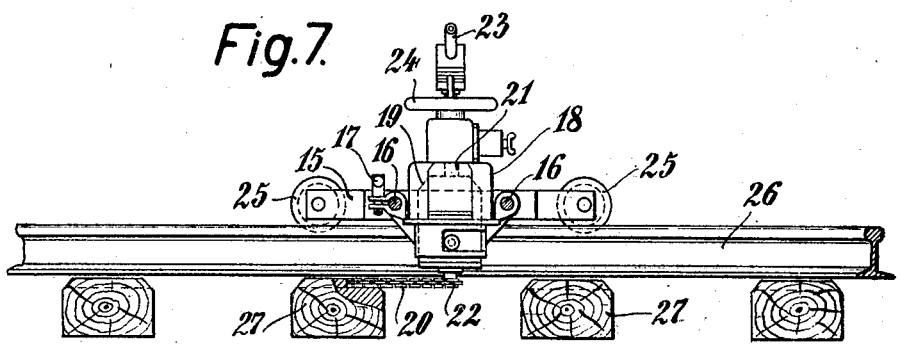
Figure 7 is a cross section through this machine.

In the embodiment illustrated in Figures 5 to 7 the frame 15 of the machine consists of two angle iron traverses which are bent off on their ends and rigidly connected to one another by two bars 16 see particularly Figure 6. A case 18 that includes the driving motor 19 for the chain cutter 20 is shiftably mounted on the bars 16 and can be fixed thereon by clamps 17. The vertical shaft 21 of the motor 19 carries on its lower end the driving sprocket wheel 22 for the chain cutter and has loosely mounted on its upper end a handle 23. Between the latter and the motor case 18 is provided a hand wheel 24 by the rotation of which the shaft 21 and therewith the chain cutter 20 can be raised or lowered as required. Two running wheels 25 are provided on each side of the frame 15 which wheels again run on the track 26, 26. 27 denotes the ties the decayed layer of which is to be removed by the chain cutter 20.

The milling work to be carried out by the last-described machine is brought about by causing the chain cutter to make a cutting motion like that of a scythe. To this end the chain cutter 20 is first positioned with its longitudinal axis in parallel to the rails 26, as marked by position I in Figure 6 in dotted lines, and, while running swung in the direction of arrow $x$, Figure 6, by means of the handle 23. Thereupon it is again swung to position I, somewhat fed in the direction of arrow $y$, Figure 6, swung anew in direction of arrow $x$ and back to initial position. This procedure is repeated until the chain cutter 20, the length of which is at least equal to the width of the recess to be made, has milled off the decayed wood up to line $z$, Figure 6. Then the chain cutter is set to a position normal to the rails 26, as illustrated by position II in dot and dash lines in Figure 6, and shifted in this position in the direction of the track until the recess is completed. When a particularly accurate recess is to be cut, the chain cutter 20 may then be once moved in position II over the recess in the direction of the rails.

It may still be noted that the described machine can be fixed on the rails 26 in which case the chain cutter is shiftable in the direction of them. Furthermore, the swing motion of the chain cutter can be brought about by motor power in lieu of by hand.

What I claim as my invention is:—

1. A milling machine of the class described comprising a frame adapted to rest on the rails of a track supported on ties, a horizontal chain cutter mounted thereon, means for driving said chain cutter and for enabling it to enter between a rail and a tie of the track.

2. A milling machine of the class described comprising a frame adapted to rest on the rails of a track supported on ties, a horizontal chain cutter mounted thereon, means for driving said chain cutter and for enabling it to enter between a rail and a tie of the track from one side of the former.

3. A milling machine of the class described comprising a frame adapted to run on the rails of the track, a horizontal chain cutter mounted thereon, a driving motor therefor, and means for enabling said chain cutter to enter between a rail and a tie of the track.

4. A milling machine of the class described comprising a frame, a horizontal chain cutter mounted thereon, means for driving said chain cutter, and means for bodily shifting said chain cutter relatively to said frame in a horizontal direction.

5. A milling machine of the class described comprising a frame, a horizontal guide thereon, a horizontal chain cutter shiftably mounted on said guide, and means for driving said chain cutter.

6. A milling machine of the class described comprising a frame adapted to run on the rails of the track, a horizontal guide on said frame, a horizontal chain cutter shiftably mounted on said guide, and means for driving said chain cutter.

7. A milling machine of the class described comprising a frame, a horizontal guide thereon, a horizontal chain cutter shiftably mounted on said guide, means for driving said chain cutter, and means for vertically adjusting said guide on said frame.

8. A milling machine of the class described comprising a frame, a horizontal guide thereon, a horizontal chain cutter shiftably mounted on said guide, means for driving said chain cutter, means for vertically adjusting said guide on said frame, and means for turning said chain cutter about a vertical axis.

9. A milling machine of the class described comprising a frame, a horizontal guide thereon, and a horizontal chain cutter and a motor therefor directly coupled therewith, said chain cutter and motor being shiftably mounted on said guide.

10. A milling machine of the class described comprising a frame, a horizontal guide thereon, a horizontal chain cutter and a motor therefor directly coupled therewith, said chain cutter and motor being shiftably mounted on said guide, and means for turning said chain cutter and motor about a vertical axis.

11. A milling machine of the class described comprising a wheeled frame, a horizontal guide thereon, a horizontal chain cutter and a motor therefor both shiftably mounted on said guide, means for vertically adjusting said guide on said frame, and means for turning said chain cutter and motor about a vertical axis.

12. A milling machine of the class described comprising a frame, a horizontal chain cutter and a motor therefor directly coupled therewith, said chain cutter and motor being shiftably mounted on said guide, means for turning said chain cutter and motor about a vertical axis, and manipulative means for executing this turning motion.

The foregoing specification signed at Cologne, Germany, this 25th day of October, 1930.

WILHELM BÄNFER.